(12) United States Patent
Winterot et al.

(10) Patent No.: US 9,547,164 B2
(45) Date of Patent: Jan. 17, 2017

(54) DIGITAL MICROSCOPE SYSTEM

(71) Applicant: Carl Zeiss Microscopy GmbH, Jena (DE)

(72) Inventors: Johannes Winterot, Jena (DE); Hans Tandler, Jena (DE); Johannes Knoblich, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 492 days.

(21) Appl. No.: 14/104,542

(22) Filed: Dec. 12, 2013

(65) Prior Publication Data

US 2014/0168403 A1    Jun. 19, 2014

(30) Foreign Application Priority Data

Dec. 18, 2012  (DE) .................. 10 2012 223 533

(51) Int. Cl.
  *G02B 21/26*  (2006.01)
  *G02B 21/06*  (2006.01)
  (Continued)

(52) U.S. Cl.
  CPC ........... *G02B 21/26* (2013.01); *G02B 21/0088* (2013.01); *G02B 21/06* (2013.01); *G02B 21/248* (2013.01); *G02B 21/362* (2013.01)

(58) Field of Classification Search
  CPC ... G02B 21/0088; G02B 21/06; G02B 21/248; G02B 21/26; G02B 21/362
  See application file for complete search history.

(56) References Cited

U.S. PATENT DOCUMENTS

| | | | | |
|---|---|---|---|---|
| 4,337,991 A | * | 7/1982 | Benajam | G02B 21/24 359/391 |
| 5,783,835 A | * | 7/1998 | Hollman | G01R 31/311 250/559.45 |

(Continued)

FOREIGN PATENT DOCUMENTS

| | | |
|---|---|---|
| DE | 1 572 557 | 4/1970 |
| DE | 198 34 829 A1 | 2/2000 |

(Continued)

OTHER PUBLICATIONS

"Amazon: Somikon Profi-Stativ für Mikroskop-Kameras", Oct. 28, 2011, 10 pages.

(Continued)

*Primary Examiner* — Anner Holder
(74) *Attorney, Agent, or Firm* — Patterson Thuente Pedersen, P.A.

(57) ABSTRACT

A digital microscope system, having one or several objectives, a tube lens system, a digital image recording device, a stand, a holder for a specimen and an illuminating apparatus, and optionally at least one magnification changer. One or several objectives, the tube lens system, the digital image recording device and the illuminating apparatus are integrated into a compact optical assembly, and the optical assembly is joinable to the stand in several versions that differ with regard to the spatial position and orientation of the optical assembly relative to the stand and to the specimen. The spatial position and orientation of the optical assembly relative to the stand and to the specimen may correspond, in a first version of the joining, to an upright microscope configuration and, in a second version of the joining, to an inverted microscope configuration.

16 Claims, 6 Drawing Sheets

(51) Int. Cl.
*G02B 21/24* (2006.01)
*G02B 21/00* (2006.01)
*G02B 21/36* (2006.01)

(56) References Cited

U.S. PATENT DOCUMENTS

| | | | |
|---|---|---|---|
| 6,396,532 B1 | 5/2002 | Hoover et al. | |
| 9,176,309 B2* | 11/2015 | Koenig | G02B 21/0028 |
| 2002/0041438 A1* | 4/2002 | Takahama | G02B 21/0088 |
| | | | 359/363 |
| 2002/0080240 A1 | 6/2002 | Omi | |
| 2002/0154397 A1* | 10/2002 | Takahama | G02B 21/0088 |
| | | | 359/381 |
| 2003/0030747 A1 | 2/2003 | Lu et al. | |
| 2003/0063378 A1* | 4/2003 | Koyama | G02B 21/082 |
| | | | 359/388 |
| 2004/0001253 A1* | 1/2004 | Abe | G02B 21/06 |
| | | | 359/388 |
| 2008/0204551 A1* | 8/2008 | O'Connell | G02B 21/0008 |
| | | | 348/79 |
| 2009/0058608 A1* | 3/2009 | Gottlich | A61B 19/52 |
| | | | 340/10.1 |
| 2009/0075563 A1* | 3/2009 | LeMacher | B24C 3/22 |
| | | | 451/2 |
| 2012/0057013 A1* | 3/2012 | Ishiwata | G02B 21/367 |
| | | | 348/78 |
| 2012/0133756 A1* | 5/2012 | Levin | G02B 21/0088 |
| | | | 348/79 |
| 2012/0312957 A1* | 12/2012 | Loney | G02B 21/245 |
| | | | 250/201.3 |

FOREIGN PATENT DOCUMENTS

| | | |
|---|---|---|
| DE | 103 52 523 A1 | 6/2005 |
| DE | 10 2008 012 585 A1 | 9/2009 |
| DE | 10 2011 115 944 A1 | 4/2013 |
| GB | 2 084 754 A | 4/1982 |
| JP | 2001-59599 A | 3/2001 |
| JP | 2004-302441 A | 10/2004 |
| JP | 2006-98875 A | 4/2006 |
| JP | 2011-007874 | 1/2011 |
| JP | 2011027906 | 2/2011 |

OTHER PUBLICATIONS

Flyer, "DigiMicro 2.0 Scale", 2008, 2 pages.
"DigiMicro 2.0 Scale Bedienungsanleitung", 2008, 13 pages.
"Next Generation 3D Digital Microscope Fast, Easy and High Quality Total Imaging Solutions KH-8700", May 6, 2012, 16 pages.
Mfg4 Industry Intersection Learning Lounge Schedule, May 8, 2012, 4 pages.

* cited by examiner a)

b)

c)

DIGITAL MICROSCOPE SYSTEM

RELATED APPLICATION

This application claims priority to German Application No. 10 2012 223 533.7 filed Dec. 18, 2012, which is incorporated herein in its entirety by reference.

FIELD OF THE INVENTION

The invention relates to a digital microscope system, comprising one or several objectives, a tube lens system, a digital image recording device, a stand, a holder for a specimen and an illuminating apparatus, and optionally at least one magnification changer.

BACKGROUND OF THE INVENTION

Digital microscope systems per se are known. With digital microscope systems, unlike conventional optical microscopes, the image of the specimen examined is not observed through an eyepiece but first converted optoelectronically by application of a digital image recording device and then either presented visually again by means of an image display device, or else the image content is analyzed electronically. With such a system, observation and analysis are not tied to the location of image recording but can be freely selected thanks to the facilities for transmitting electronic image signals. This enables, e.g., optimum adaptation to the body constitution of an observer, image transmission via communication means to several observation or analysis locations, and adaptation of the microscope to observation tasks that cannot be carried out with conventional microscopes.

Commercially available digital microscopes or microscope systems are intended to suit particular applications and thus mostly designed either as upright or inverted microscopes. Conversion for changing applications that require a change from the upright to the inverted microscope type or vice versa is either not possible at all or only with an excessive amount of work and time.

SUMMARY OF THE INVENTION

Within the scope of the invention described below, upright microscopes are to be understood to be microscopes in which the objective looks at the specimen from above, i.e., at least essentially in the direction of gravity. By contrast, the objective of an inverted microscope is attached below the specimen stage and looks up through the same at the specimen. Inverted microscopes are suitable especially for examining live cells enclosed, e.g., in culture vessels.

Departing from that state of prior art, the invention is based on the problem to improve a digital microscope system of the kind described above in such a way that its conversion and, thus, its universal use as a both upright and inverted microscope is possible with the least amount of work.

The invention provides for
one or several objectives, the tube lens system, the digital image recording device and the illuminating apparatus to be integrated into a compact optical assembly, and structure employed for joining the optical assembly to the stand in several versions that differ with regard to the spatial position and orientation of the optical assembly relative to the stand and to the specimen.

For example, the spatial position and orientation of the optical assembly relative to the stand and to the specimen corresponds to an upright microscope in a first joining version, and to an inverted microscope in a second joining version.

For the purpose of converting the microscope arrangement from the first to the second joining version, the optical assembly is designed or arranged so as to be rotatable, e.g., by an angle of 180 degrees about an axis lying in the object plane, in such a way that this rotation can be carried out either manually (with the assembly being disconnected from the stand), or by means of a swiveling device (with the assembly remaining joined to the stand).

According to an example embodiment, the stand has a straight-line slideway for the optical assembly, with mutually engaging drive elements being provided on the straight-line slideway that enable a change of position of the optical assembly along the stand, especially for the purpose of adjusting the working distance between objective and specimen. The drive elements may be configured, e.g., as a rack on the stand column and a pinion on the optical assembly or in the form of a linear stepping motor with the stator provided on the stand and one or several rotors on the optical assembly.

In an example embodiment, the optical assembly is equipped with two objectives of identical optical design. Assigned to a first objective is a working position in which its optical axis and the optical axis of the tube lens system intersect at an angle of 90 degrees. Assigned to the second objective is a working position in which its optical axis and the optical axis of the tube lens system lie on a common straight line. Arranged at the common intersection point of the optical axes of the objectives and the tube lens system is a beam splitter/beam combiner.

In an alternative embodiment, the optical assembly is equipped with two objectives that differ in their optical designs and are arranged on an objective changer. One of the two objectives is in the working position, where it can be replaced with the other by means of the objective changer. In two versions of this embodiment, the optical assembly is configured either in such a way that the optical axis of the objective in the working position either is at right angles to, or coincides with, the optical axis of the tube lens system.

In another example embodiment, the illuminating light is coupled into the imaging beam path by application of the beam splitter/beam combiner that is arranged at the intersection of the optical axes of the objectives with the optical axis of the tube lens system.

The specimen holder may be configured in the form of a specimen stage that can be pivoted or slid into the object plane.

In another example embodiment of the invented digital microscope system, a magnification changer is integrated in the imaging beam path of the optical assembly. The magnification changer features optical components that are axially displaceable and, for this purpose, for example, driven by motors. The inventive idea also includes the integration of several magnification changers that are arranged one behind the other and optically matched to one another as well as to the other components.

The light source of the illuminating apparatus comprises at least one LED, but can include several LEDs that can be switched on and off separately. Especially for the generation of darkfield contrast, an annular arrangement of several LEDs arranged concentrically with the light entry aperture of the objective. As an alternative, an annular light-emitting surface may be provided.

The optical assembly is connected with a control and image analysis system via signal paths and with a power supply unit via supply lines.

Furthermore, it is within the scope of the invention to shorten the length of the light path in the optical assembly by combining the tube lens system with the reflective coupling-in of the light. If the tube lens system includes two or more parts, with a splitter arranged between two positive partial focal lengths of the tube lens system, one part of the tube lens system can be used for both illumination and imaging. This embodiment version permits a more efficient utilization of the space available for the tube lens system anyhow. In this case, no extra space is required for light coupling between the objective and the tube. If the splitter is configured as a prism, the light path in glass needs to be taken into account. If the splitter is a plate arranged obliquely in the beam path, object observation should preferably be by reflected light to avoid astigmatism.

A digital microscope system of the modular design described is capable of being used as an upright as well as an inverted microscope, the essential advantage being that one and the same optical assembly can be used in both cases. Moreover, with the upright configuration the optical assembly can be used in two versions, viz. in a horizontal and in a vertical arrangement, and thus be optimally adapted to the respective application. The optical assembly is of compact design; change-over between the two ways of joining it can be easily carried out by hand, for example without the aid of any tools.

It is understood that the features mentioned before and those to be explained below are applicable not only in the combinations stated but also in other combinations or as stand-alone features without leaving the scope of the present invention.

BRIEF DESCRIPTION OF THE DRAWINGS

Below, the invention will be explained in greater detail with reference to exemplary embodiments. In the accompanying drawings.

DETAILED DESCRIPTION OF THE DRAWINGS

Figure 1:
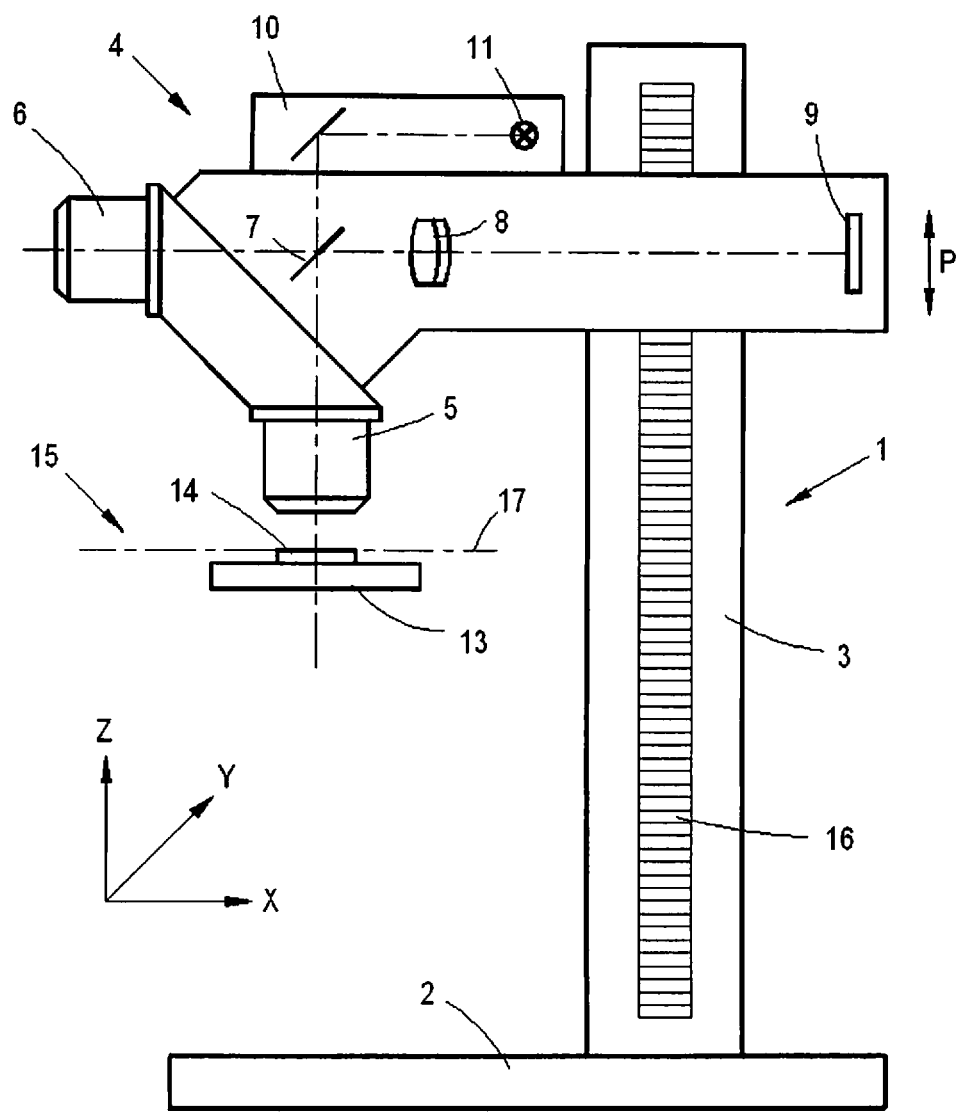
FIG. 1 depicts an example embodiment of the invented microscope system in an upright configuration, including a stand comprising a base plate and a stand column standing on it, and a compact optical assembly, the two objectives, a beam splitter/beam combiner, a tube lens system and a digital image recording device.

FIG. 1 depicts a first exemplary embodiment of the invented digital microscope, including a stand 1 having a base plate 2 and a stand column 3 standing upright on it, an optical assembly 4, in which two objectives 5 and 6, a beam splitter/beam combiner 7, a tube lens system 8, a digital image recording device 9 and an illuminating apparatus 10 with a light source 11 and a deflecting element 12 are combined in a compact unit, and a specimen stage 13, on which a specimen 14 to be examined is placed with a defined orientation relative to an object plane 15.

Figure 3:
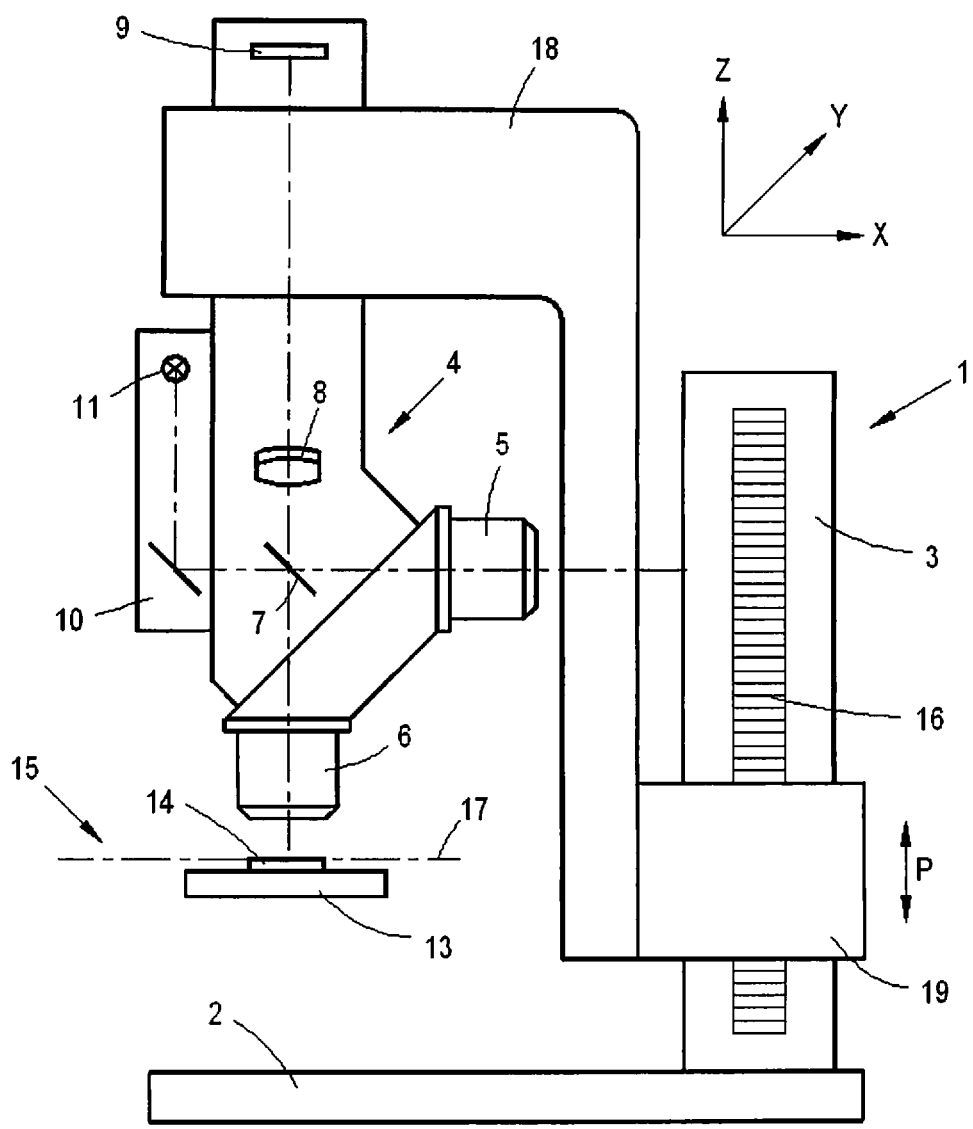
FIG. 3 depicts an example embodiment of the invented microscope system in an upright configuration, including the same stand and the same optical assembly as in the exemplary embodiment shown in FIG. 1, however with the optical assembly being rotated by 90 degrees in the drawing plane.

The objectives 5 and 6 are, for example, of identical optical design; in the configuration shown here, only the objective 5 is in the working position, whereas the use of the objective 6 is subject to the configuration shown in FIG. 3. As a light source 11, an arrangement of one or several LEDs is provided. The beam splitter/beam combiner 7, here configured, e.g., as a plane-parallel plate, deflects the imaging light received by the objective 5 by 90 degrees toward the tube lens system 8, which projects the imaging light onto the sensor surface of the digital image recording device 9.

In this configuration, light incidence through the objective 6 is intercepted by a lens cap, a shutter or an aperture placed into the beam path (not shown in the drawing), so that the light reflected or scattered by the specimen 14 is received only by the objective 5 for imaging the specimen 14.

A portion of the illuminating light coming from the light source 11 and deflected by the deflecting element 12 passes the beam splitter/beam combiner 7 and, via the objective 5, reaches the specimen 14, whereas the remaining portion of the light is directed by the beam splitter/beam combiner 7 to the objective 6, but is intercepted there rather than advancing through the objective 6.

The object plane 15 lies in a plane defined by the coordinates X, Y, i.e., normal to the drawing plane X, Z. The specimen stage 13 is movably supported so that it can be swung or slid into the position shown, in coordinate direction X and/or Y. Optionally, structure for changing the position of the specimen stage 13 in coordinate direction Z may be provided.

By application of a straight-line slideway and mutually engaging drive elements, the optical assembly 4 is connected with the stand column 3 in such a way that its defined displacement along the stand column 3 can be performed in the arrow directions P. The drive elements are designed, e.g., in the form of a manually operated rack-and-pinion drive; preferably, however, an electronically controllable linear drive motor with stator elements 16 on the stand column 3 and rotors (not shown in the drawing) on the optical assembly 4 are provided. Of course, the inventive idea also includes other drive versions, such as, e.g., screw-and-nut drives, piezo drives, ultrasonic drives or linear inductive drives.

In FIG. 1, the spatial position and orientation of the optical assembly 4 relative to the stand column 3 corresponds to a microscope of the upright type.

Connections of the optical assembly 4 to a control and image analysis system are provided that are customary in prior art and, therefore, are neither shown nor further explained here.

According to the invention, the same components as those shown in FIG. 1 can also be used for an inverted microscope configuration, as explained below with reference to FIG. 2.

To enable this universal applicability, the optical assembly 4, the stand column 3 and the straight-line slideway with the mutually engaging drive elements on the stand column 3 and on the optical assembly 4 are, in accordance with the invention, designed in such way that the microscope configuration can be converted from upright (cf. FIG. 1) to inverted (FIG. 2) in a simple manner by mere rotation of the optical assembly 4 by 180 degrees about an axis 17 lying in the object plane 15. In the inverted configuration, too, the objective 5 is in working position and active.

The conversion is carried out, e.g., by first disconnecting the optical assembly 4 from the stand column 3 or the straight-line slideway and the drive elements, turning it by 180 degrees, and then reconnecting it to the stand column 3 or to the straight-line slideway and the drive elements. For the duration of these manipulations, the specimen stage 13 is temporarily swung out of the way.

With this arrangement, the problem underlying the invention is solved, viz. improving a digital microscope system in such a way that it can be used as an upright as well as an inverted microscope with the least conversion effort.

Figure 2:
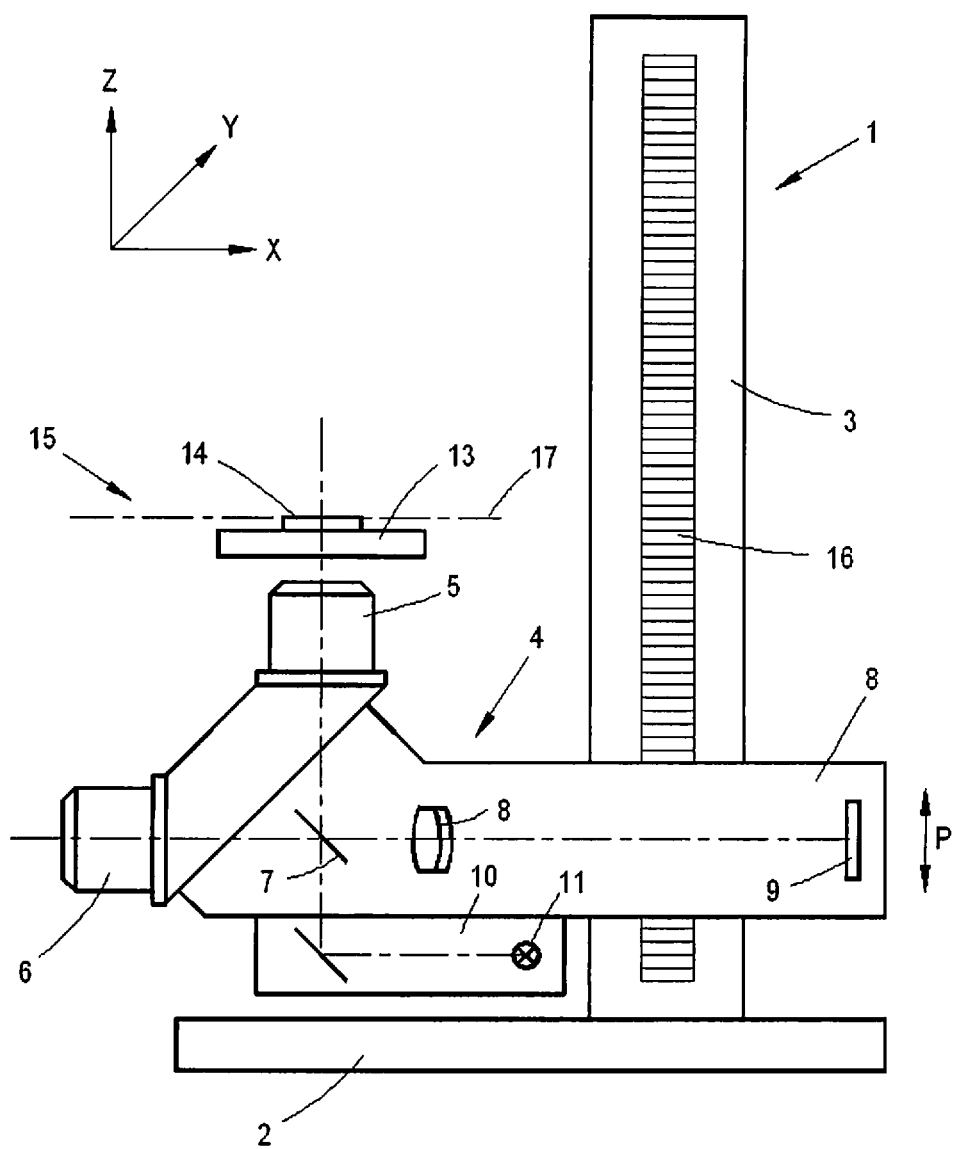
FIG. 2 depicts an example embodiment of the invented microscope system in an inverted configuration, including the same stand and the same optical assembly as in the exemplary embodiment shown in FIG. 1.

In connection with FIG. 3, an example embodiment is described in which the optical assembly 4 illustrated in connection with FIG. 1 and FIG. 2 is aligned in parallel to the stand column 3 and is joined to the stand column 3 by way of a swiveling device 18 and a swiveling drive 19. Swiveling device 18, swiveling drive 19 and optical assembly 4 can be displaced together in arrow directions P along the stand column 3. For this purpose, swiveling device 18 and swiveling drive 19 are joined to the stand column 3 by way of a straight-line slideway and mutually engaging drive elements. The straight-line slideway and the drive elements may be configured as already described above.

By operation of the swiveling device 18 and the swiveling drive 19, the optical assembly 4 can be swiveled out of the drawing plane about the axis 17 by an angular range of, e.g., ±45 degrees, so that the specimen 14 can be observed from the side at an angle within this range.

Here, the objective 6 is in the working position, whereas light incidence through the objective 5 is intercepted by a lens cap, a shutter or a diaphragm placed in the beam path (not shown in the drawing), so that the light reflected or scattered by the specimen 14 is received by the objective 6 only. The spatial position and orientation of the optical assembly 4 correspond to a microscope of the upright type.

FIG. 1, FIG. 2 and FIG. 3, seen in combination, make the advantage of the flexible usability of the optical assembly 4 evident.

Figure 4:
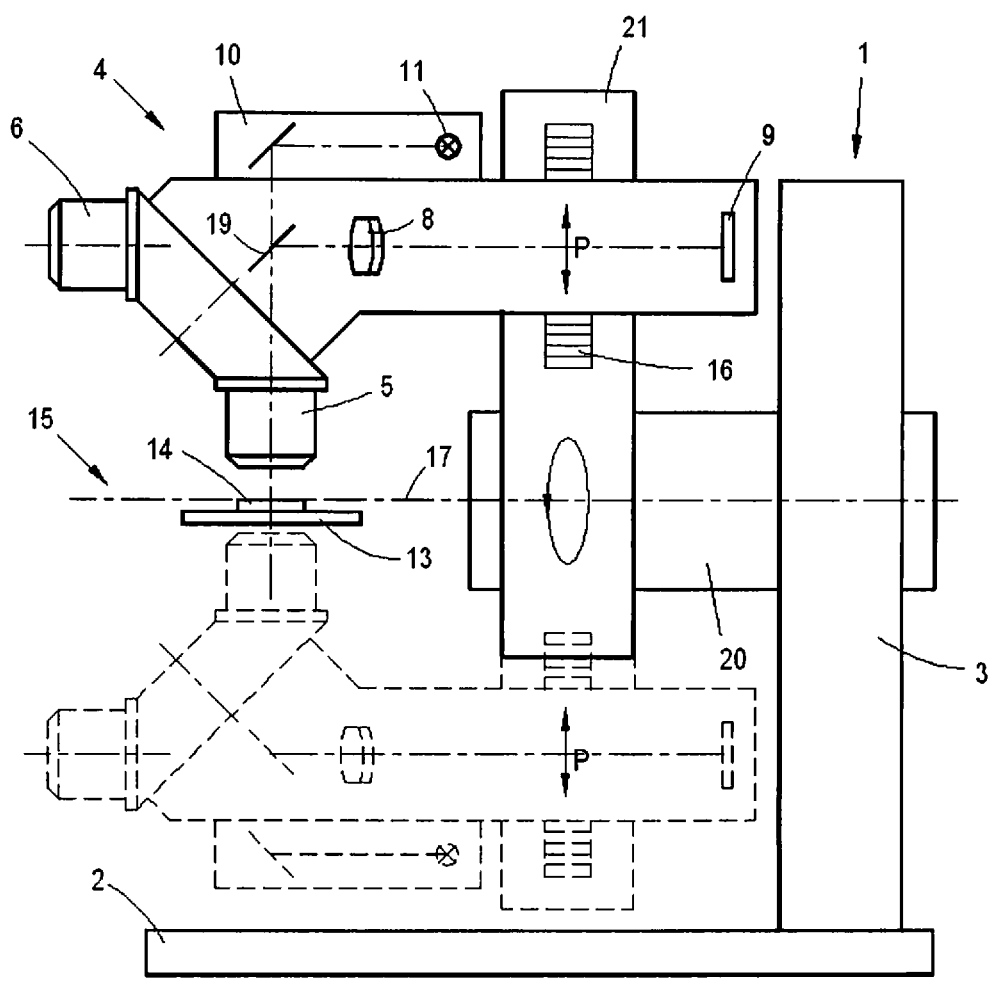
FIG. 4 depicts an example embodiment of the invented microscope system with the same optical assembly as in the example embodiment shown in FIG. 1, however coupled with a swiveling device for selection between the upright or inverted configuration.

FIG. 4 illustrates another embodiment of the invented digital microscope, in which the optical assembly 4 is oriented in relation to the stand column 3 as shown in FIG. 1 and FIG. 2. Here, however, unlike the embodiment as shown in FIG. 1 and FIG. 2, conversion from the upright to the inverted microscope configuration or vice versa is not performed manually; rather, the stand column 3 is equipped with a swiveling device 20 on which a guide column 21 is arranged that can be swiveled about an axis 17 lying in the object plane 15 and that carries the optical assembly 4.

The spatial position and orientation of the optical assembly 4 relative to the stand column 3, indicated by solid lines in FIG. 4, corresponds to a microscope of the upright type as in FIG. 1. The optical assembly 4 can be displaced along the guide column 21 in the arrow directions P to permit setting the working distance or focusing; for this purpose, here again, the optical assembly 4 is joined to the guide column 21 by way of a straight-line slideway and mutually engaging drive elements.

If an inverted microscope configuration is required, the optical assembly 4 can, by operation of the swiveling device 20, swiveled to the position indicated by broken lines in FIG. 4. The spatial position and orientation of the optical assembly 4 relative to the stand column 3 then corresponds to a microscope of the inverted type as in FIG. 2.

With regard to this, according to another embodiment the optical assembly 4 can be swiveled between two click stops so that at the first click stop it is in the position of the upright and at the second click stop in the position of the inverted configuration. The two click stop positions correspond to the two swivel positions shown in FIG. 4.

The scope of the invention expressly includes embodiments also in which the optical assembly 4 can be swiveled from one or both of these click stop positions by a specified angular range of, e.g., ±45 degrees about the axis 17, i.e. out of the drawing plane, so that the specimen 14 can be observed from the side at an angle within this range.

If, moreover, a 360-degree range of observation angles is required for particular specimens, the swiveling device 20 may be designed in such a way that any observation angle within that range can be set. The configuration of the specimen stage 13 or any other specimen holder would be adapted to this case. If, e.g., bulky or irregularly shaped specimens are to be observed from such a large range of observation angles, a specimen holder, e.g., in the form of a clamping or workholding fixture is provided. For extremely large or heavy specimens it is feasible to arrange the optical assembly on a cantilever- or gantry-type stand, a positioning system or robot arm.

Figure 5:
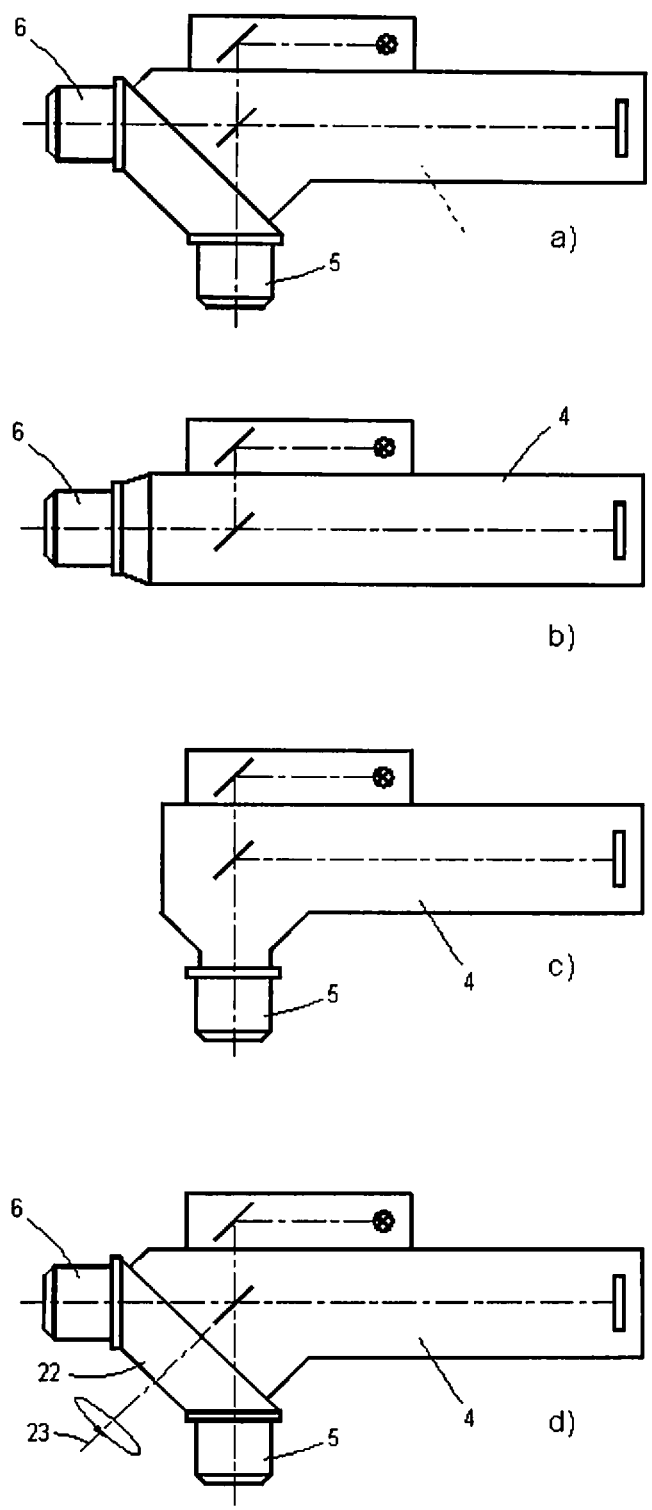
FIG. 5 depicts a selection of embodiments of the optical assembly that come within the scope of the invention.

FIG. 5 shows a selection of embodiments of the optical assembly 4 that come within the scope of the invention. For the sake of clarity, the embodiments of the optical assembly 4 are shown without stand column 3 or swiveling device 18 or 20, respectively.

FIG. 5a) shows the embodiment used, e.g., in FIG. 1, FIG. 2, FIG. 3, FIG. 4, FIG. 5b) and FIG. 5c) shows embodiments with only one objective each, the embodiments shown in FIG. 5b) being suitable for use in the configuration shown in FIG. 3, and the embodiment shown in FIG. 5c) being suitable for use in the configurations shown in FIG. 1, FIG. 2 and FIG. 4.

In an embodiment shown in FIG. 5d), the optical assembly 4 is equipped with an objective changer 22 carrying two objectives 5 and 6 that differ in respect of their optical designs. By rotation about the axis 23 they can selectively be placed into the imaging beam path coming from the specimen 14, either objective thus being available for particular applications. The embodiment shown in FIG. 5d) can be used with the example embodiments shown in FIG. 1 through FIG. 4, with the imaging beam path in FIG. 1, FIG. 2 and FIG. 4 being deflected by the beam splitter/beam combiner 7, whereas in the example embodiment shown in FIG. 3 the imaging beam path can pass the beam splitter/beam combiner 7 without being deflected.

Figure 6:
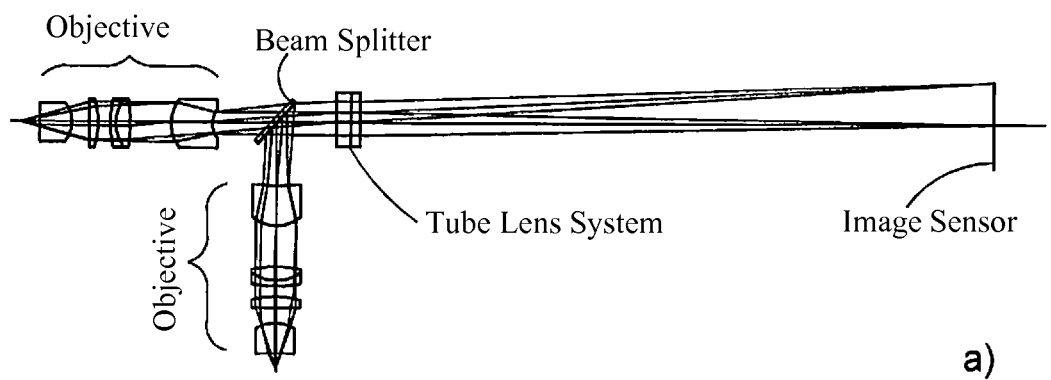
FIG. 6 depicts example embodiments of the imaging beam path in the optical assembly.
Figure 6:
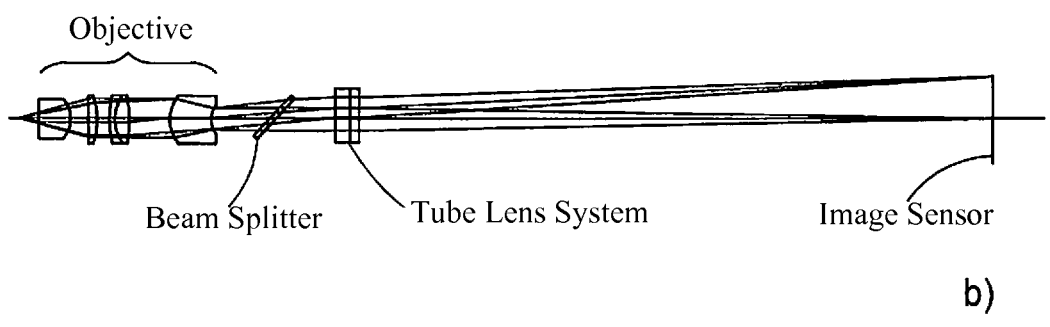
Figure 6:
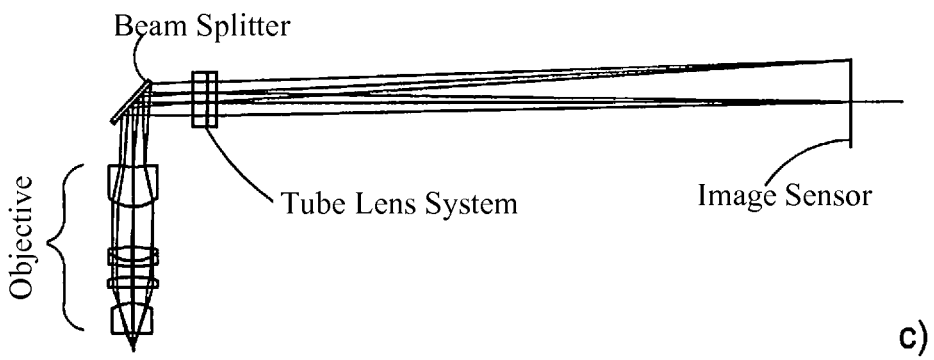

FIG. 6 shows different versions of the imaging beam path and versions of the arrangement of the optical elements constituting the beam path.

Version 6a) corresponds to the embodiment shown in FIG. 5a), version 6b) to that shown in FIG. 5b), and version 6c) to that shown in FIG. 5c).

For the embodiment shown in FIG. 5d), both version 6b) and version 6c) are eligible.

LIST OF REFERENCE NUMBERS 1 stand
2 base plate
3 stand column
4 assembly
5 objective 6 objective
7 beam splitter/beam combiner
8 tube lens system
9 image recording device
10 illuminating apparatus
11 light source
12 deflecting element
13 specimen stage
14 specimen
15 object plane
16 stator elements
17 axis
18 swiveling device
19 swiveling drive
20 swiveling device
21 guide column
22 objective changer
23 axis

The invention claimed is:

1. A digital microscope system, comprising:
one or several objectives;
a tube lens system having an optical axis;
a digital image recording device;
a stand;
a holder for a specimen; and
an illuminating apparatus;
wherein
the one or several objectives, the tube lens system, the digital image recording device and the illuminating apparatus are integrated into a compact optical assembly, and
further comprising structure that couples the compact optical assembly to the stand in several joining versions that differ with regard to the spatial position and orientation of the compact optical assembly relative to the stand and to the specimen holder;
further wherein in a first joining version of the several joining versions, the spatial position and orientation of the optical assembly relative to the stand and to the specimen correspond to an upright microscope, and
in a second joining version of the several joining versions, the spatial position and orientation of the optical assembly relative to the stand and to the specimen correspond to an inverted microscope.

2. The digital microscope system as claimed in claim 1, in which the compact optical assembly is swivelable by an angle of 180 degrees about an axis lying in an object plane, the swiveling being performable either manually with the joining disconnected, or by application of a swiveling device.

3. The digital microscope system as claimed in claim 1, in which the stand further comprises a straight-line slideway for the compact optical assembly and mutually engaging drive elements that engage the straight line slideway to the compact optical assembly, configured to permit changing the spatial position of the optical assembly on the stand.

4. A digital microscope system as claimed in claim 1, in which the optical assembly comprises two objectives of identical optical design including a first objective and a second objective,
the first objective being in a first working position in which a first optical axis thereof and the optical axis of the tube lens system are oriented at an angle of 90 degrees,
the second objective being in a second working position in which a second optical axis thereof lies on a straight line with the optical axis of the tube lens system, and
further comprising a beam splitter/beam combiner located at a common point of intersection of the first optical axis, the second optical axis and the optical axis of the tube lens system.

5. The digital microscope system as claimed in claim 1, in which the optical assembly comprises two objectives that differ in optical design arranged on an objective changer, the objective changer being structured such that the two objectives are exchangeable with each other with regard to a working position, wherein an optical axis of the objective in the working position is oriented at an angle of 90 degrees to an the optical axis of the tube lens system or lies on a straight line with the optical axis of the tube lens system.

6. The digital microscope system as claimed in claim 4, wherein the beam splitter/combiner couples illuminating light from the illuminating apparatus into an imaging beam path.

7. The digital microscope system as claimed in claim 5, further comprising a beam splitter/combiner that couples illuminating light from the illuminating apparatus into an imaging beam path.

8. The digital microscope system as claimed in claim 1, wherein a distance between a respective active objective of the one or several objectives and an object plane is variable.

9. The digital microscope system as claimed in claim 1, wherein the illuminating apparatus comprises at least one LED.

10. The digital microscope system as claimed in claim 9, wherein the illuminating apparatus comprises several LEDs that can be switched on and off separately.

11. The digital microscope system as claimed in claim 1, wherein the illuminating apparatus comprises an annular light-emitting surface or an annular arrangement of several LEDs arranged concentrically with an optical axis of an active objective.

12. The digital microscope system as claimed in claim 1, further comprising at least one magnification changer integrated in an imaging beam path.

13. The digital microscope system as claimed in claim 12, in which the magnification changer comprises axially displaceable optical components.

14. The digital microscope system as claimed in claim 13, in which the axially displaceable optical components are, for the purpose of displacement, driven by motors.

15. The digital microscope system as claimed in claim 1, in which the specimen holder comprises a specimen stage that can be swiveled or slid into an object plane.

16. The digital microscope system as claimed in claim 1, further comprising a control device and an image analysis system and wherein the optical assembly is operably connected to the control device and the image analysis system.

* * * * *